Sept. 22, 1936.   Z. RIDDLE   2,054,947
AUTOMATIC VARIABLE PITCH PROPELLER
Filed June 25, 1930   2 Sheets-Sheet 1
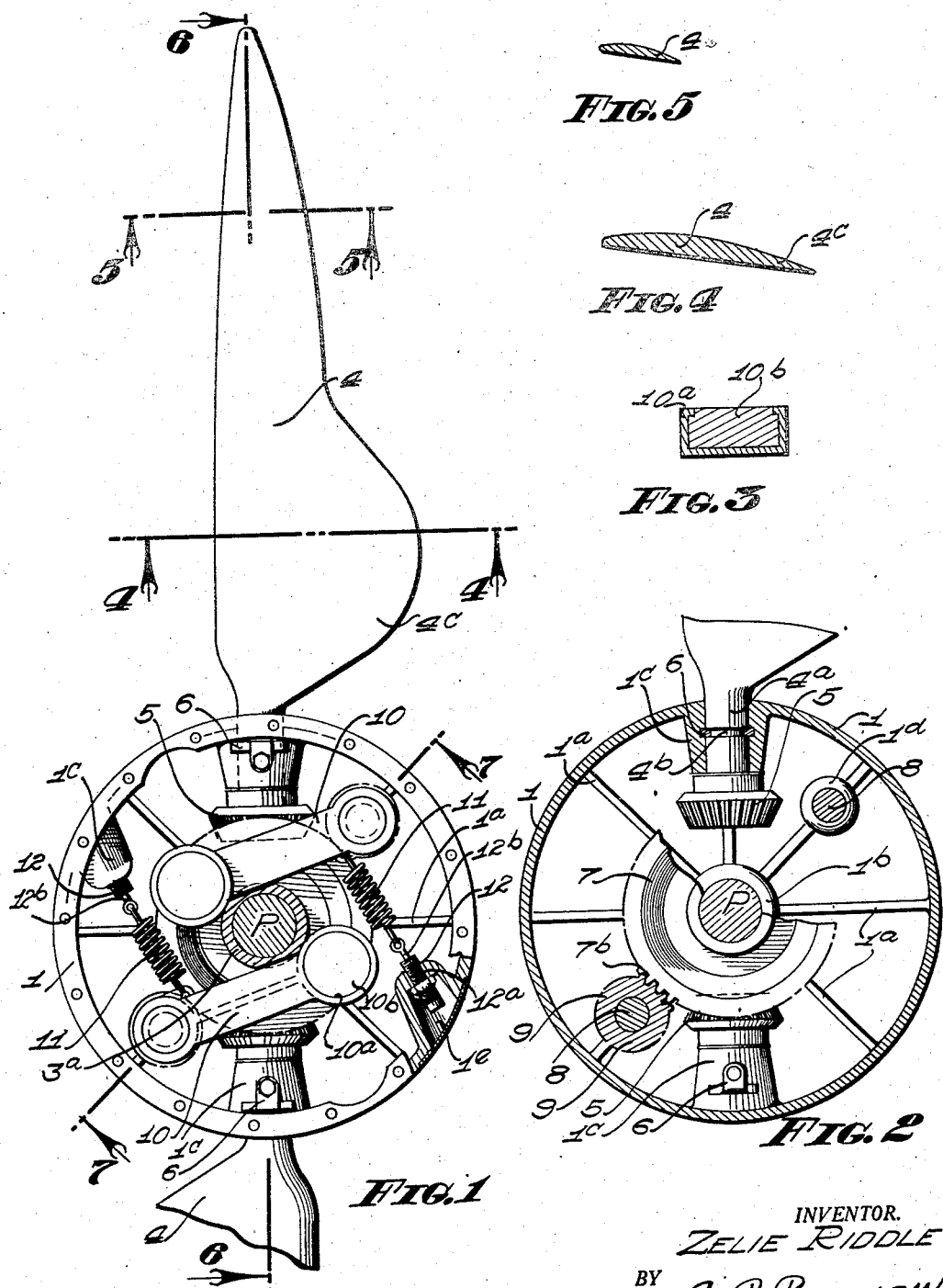
INVENTOR.
ZELIE RIDDLE
BY A. B. Bowman
ATTORNEY Sept. 22, 1936.  Z. RIDDLE  2,054,947
AUTOMATIC VARIABLE PITCH PROPELLER
Filed June 25, 1930  2 Sheets-Sheet 2
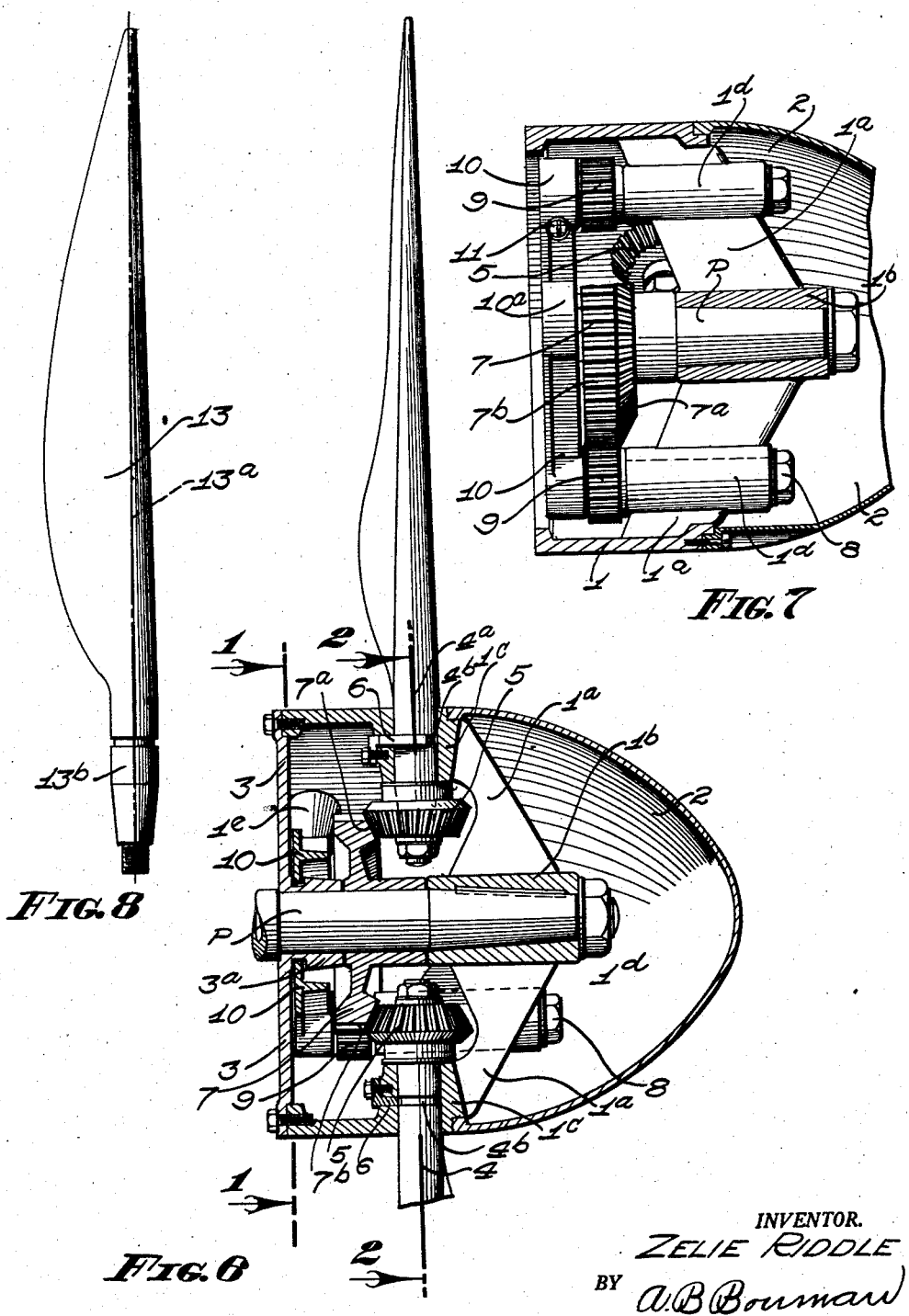
INVENTOR.
ZELIE RIDDLE
BY A. B. Bouman
ATTORNEY Patented Sept. 22, 1936

2,054,947

UNITED STATES PATENT OFFICE 2,054,947

AUTOMATIC VARIABLE PITCH PROPELLER

Zelie Riddle, San Diego, Calif.

Application June 25, 1930, Serial No. 463,606

1 Claim. (Cl. 170—162)

My invention relates to automatic variable pitch propellers, and the objects of my invention are:

First, to provide a propeller of this class in which the pitch automatically changes according to the density of the air so as to absorb the power of the airplane engine at its rated speed at any altitude;

Second, to provide a propeller of this class in which the thrust or traction of the propeller may remain constant for all altitudes or actually increase with altitude if desired;

Third, to provide a propeller of this class which eliminates the haphazard arrangement of manually adjusting the usual variable pitch propeller and the complicated controls therefor;

Fourth, to provide a propeller of this class in which the pitch may be varied by changing the speed of the engine as well as by change of air density, so that the pilot may exercise a certain control of the propeller pitch by varying the engine speed and thereby compensate for conditions other than variation in air density, as when the weight of the airplane is changed in flight;

Fifth, to provide a propeller of this class in which at idling speeds the pitch may be so low that the slip stream or wind created by the propeller when the airplane is standing is insufficient to cause discomfort to the passengers alighting or going aboard the airplane, and furthermore, at such times has but little tendency to move the airplane forward;

Sixth, to provide a propeller of this class which is particularly adapted for use in connection with airplane engines having super-chargers, such engines being capable of delivering sea-level power at high altitude;

Seventh, to provide a propeller of this class which increases the altitude and speed performance of an airplane;

Eighth, to provide a variable pitch propeller in which the drag and parasite resistance is not appreciably increased, and which is fully capable of rotating at the speeds of conventional non-variable propellers;

Ninth, to provide a propeller of this class which responds quickly to sudden changes in air density, whereby the airplane may maintain a more level flight under "bumpy" conditions;

Tenth, to provide a propeller of this class which prevents overspeeding or racing of the engine;

Eleventh, to provide a propeller of this class which is light, though sturdy of construction, and requires but little movement of its parts to shift the propeller blades, whereby wear is reduced to a minimum; and Twelfth, to provide a propeller of this class which is sturdy of construction, durable, efficient in its action, which is not affected by extreme temperatures or weather conditions, and which will not readily deteriorate or get out of order.

With these and other objects in view as will appear hereinafter, my invention consists of certain novel features of construction, combination and arrangement of parts and portions as will be hereinafter described in detail and particularly set forth in the appended claim, reference being had to the accompanying drawings and to the characters of reference thereon, which form a part of this application, in which:

Figure 1 is a transverse sectional view substantially through 1—1 of Fig. 6, with parts and portions shown in elevation; Fig. 2 is a fragmentary transverse sectional view through 2—2 of Fig. 6, with parts and portions as shown in elevation; Fig. 3 is a sectional view taken through the extended end of a governor arm; Figs. 4 and 5 are sectional views of the propeller taken through 4—4 and 5—5, respectively, of Fig. 1; Fig. 6 is a sectional view through 6—6 of Fig. 1, with parts and portions as shown in elevation; Fig. 7 is a sectional view substantially through 7—7 of Fig. 1, with parts and portions as shown in elevation; and Fig. 8 is a front view of the modified form of propeller blade.

Similar characters of reference refer to similar parts and portions throughout the several views of the drawings.

Hub casing 1, nose piece 2, end plate 3, propeller blades 4, propeller blade gears 5, propeller locking means 6, transmitting gear 7, governor shafts 8, governor gears 9, governor arms 10, springs 11, spring anchors 12, and modified propeller blade 13 constitute the principal parts and portions of my novel automatic variable pitch propeller.

A hub casing 1 is provided, which is substantially in the form of a short annular cylinder. At its forward portion, the hub casing is provided with inwardly and forwardly extending webs 1a, which join a hub 1b located concentrically relative to the casing 1. The hub 1b is adapted to receive the end of a propeller shaft P, shown fragmentarily in the figure. Extending forwardly from the casing 1 so as to cover the webs 1a and hub 1b is a nose 2, which is stream-lined. The rear end of the casing 1 is closed by an end plate 3, which is provided with a sleeve portion 3a adapted to fit around the propeller shaft P.

Extending inwardly near the forward end of the casing 1 are propeller blade bearings 1c. Two or more of these bearings are provided, depending upon the number of propeller blades it is desired to use. Two propeller blades are shown in the structure illustrated. Rotatably mounted in each bearing 1c is the shaft portion 4a of a propeller blade 4. The longitudinal axis of each propeller blade is closer to the leading edge than to the trailing edge thereof so that the center of thrust of the propeller blade is between the axis and the trailing edge. The reason for this will be brought out hereinafter.

The shaft 4a of each propeller extends through its bearing 1c, and has secured to its protruding inner end a bevel gear 5. In order to lock the propeller against radial movement, but permitting rotation thereof, a key or locking means 6 in the form of a yoke may be inserted into a slot provided in the bearing 1c so as to fit in a channel 4b provided in the shaft 4a, as shown best in Figs. 2 and 6. This locking means 6 prevents the propeller from leaving the hub casing by reason of centrifugal force.

Rotatably mounted upon the propeller shaft P, between the sleeve 3a and the hub 1b, is a transmitting gear 7, comprising a bevel gear portion 7a and a spur gear portion 7b. The bevel gear portion 7a is adapted to engage all of the propeller blade bevel gears 5, so that rotation of the transmitting gear causes equal rotation of all the propeller blade gears, whereby the change in pitch of the several propeller blades is equal.

Certain of the webs 1a support bearings 1d arranged in parallel disposed relation to the propeller shaft P. These bearings journal governor shafts 8.

Opposite the spur gear portion 7b of the transmitting gear 7, each of the shafts 8 is provided with a governor pinion gear 9.

Also supported on each shaft 8 and connected with the corresponding governor gear 9, is a governor arm 10; it is preferred to provide two sets of these governor arms and gears so as to balance the weight about the axis of the propeller shaft. The extended ends of the governor arms 10 are provided with cup portions 10a, which are adapted to receive a heavy metal, such as lead, forming a weight 10b.

When the propeller is idle, the governor arms 10 extend inwardly from their respective shafts 8 and rest against opposite sides of the sleeve 3a, as shown best in Figs. 1 and 6. Each governor arm is normally held in such position by a spring 11, which extends clear of the end of the other governor arm and is connected to an anchor 12.

Formed in the hub casing 1 in alinement with the normal axis of each spring 11, is a socket or recessed portion 1e, having a screwthreaded hole in its inner end adapted to receive an externally threaded sleeve portion 12a of said anchor 12. The sleeve portion 12a is adjustable longitudinally within the corresponding socket 1e. Each spring is attached to a rod portion 12b of the anchor which extends through the sleeve 12a so as to allow said sleeve to rotate without twisting the springs.

In the structure shown in Fig. 1, each propeller blade is provided with a protuberance or fin 4c adjacent its shaft portion 4a. This fin increases the offset relation of the center of pressure to the axis of rotation of the propeller.

In the structure shown in Fig. 8, the propeller blade 13, while having its axis 13a adjacent its leading edge, is without the fin along its trailing edge, and consequently the torque exerted on its shaft 13b when the propeller is revolving around the propeller shaft P is less than the torque exerted on the shaft 4a of the propeller blade 4, under like conditions.

It is well known that the conventional non-variable pitch propeller requires not only a certain definite speed at which to develop its most efficient thrust, but has but one altitude at which it can develop its maximum thrust. Above and below this particular altitude, the efficiency of the propeller decreases. With my automatic variable pitch propeller, its efficiency is at a maximum at all altitudes of the airplane and speeds of the engine.

Operation of my automatic variable pitch propeller is as follows:

When the propeller is not revolving, the governor levers 10 are in the position shown by solid lines, and the propeller blades are in a position to have but a small pitch. At idling speed, the springs 11 allow but slight movement of the governor levers in response to the centrifugal force so that the pitch of the propellers is not materially increased. Due to the fact that the center of thrust of the propeller blades is between the center of rotation and the trailing edge of the propeller blade, said propeller blades tend to assume a position of zero pitch, and consequently tend to shift the governor levers against the action of centrifugal force.

The engine in rotating overcomes this action until an equilibrium is established, at which the propeller is absorbing all the power available from the engine.

Upon taking off, the pitch increases slightly as the speed of the airplane picks up, due to the forward motion of the airplane, thus giving maximum thrust for the entire period of taking off.

As the airplane increases its altitude, the density of the air decreases, whereby the pressure of the air which tends to cause the propeller blades to assume a position of zero pitch is reduced. This causes the governor levers or arms 10 to shift outwardly so as to compensate for the lowered air density, whereby the propeller blades assume a new and increased pitch. Thus, the pitch of the propeller changes in inverse proportion to the change in air density, increasing in pitch as the airplane ascends and decreasing as the airplane descends. This change in pitch is just sufficient to permit the propeller to absorb at any altitude all the available power of the engine for any given speed thereof, and deliver the maximum thrust or traction.

Above the critical altitude of the engine where the power thereof decreases, the pitch of the propeller blades decreases also so that the propeller blade can still efficiently apply the lowered power of the engine. Thus, for all altitudes, even above the critical altitude of the engine, the propeller blades automatically assume a pitch capable of most effectively applying the power developed by the engine.

Variation in the pitch of the propeller may also be controlled by varying the speed of the engine; at the different speeds, the pitch of the propeller changes so as to come to an equilibrium at a pitch at which the power of the engine at such speed is absorbed into the most efficient thrust. Thus, should it be necessary to decrease the speed of the engine, the propeller delivers the maximum thrust possible from such speed.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention, what I claim as new and desire to secure by Letters Patent is:

In a variable pitch propeller, a hub secured to the propeller shaft of an engine, a casing secured to said hub and revoluble therewith, propeller blades extending from said casing and rotatable about their longitudinal axes, the centers of thrust of said propeller blades being between their longitudinal axes and their trailing edges, said propeller blades having their major thrust portions near said casing and decreasing outwardly, a combined bevel and spur gear revolubly mounted on the propeller shaft of the engine in said casing, beveled pinions secured to said propeller blades engageable with the beveled portion of said gear, spur pinions revolubly mounted in said casing engageable with the spur portion of said gear and weight and lever means connected with said spur pinions so constructed and arranged that said propeller blades are shifted with a varying speed of the engine shaft.

ZELIE RIDDLE.